United States Patent Office 3,336,421
Patented Aug. 15, 1967

3,336,421
O,O-DIALKYL S-(POLYHYDROXYARYL)-PHOSPHOROTHIOLOTHIONATES
Richard L. McConnell, Kingsport, Tenn., and Newton H. Shearer, Jr., Zurich, Switzerland, assignors to Eastman Kodak Company, Rochester, N.Y., a corporation of New Jersey
No Drawing. Filed Feb. 28, 1963, Ser. No. 262,291
5 Claims. (Cl. 260—953)

This invention relates to organophosphorus compounds, and more particularly to those derived from the reaction of a dialkyl phosphorothiolothionate and a quinone or substituted quinone which are especially useful as insecticides, for example, against mites and aphids.

The new class of compounds of the invention are represented by the following general structural formula:

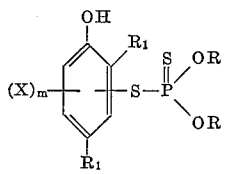

wherein m is an integer of from 1 to 2, each R represents the same or different alkyl group of from 1 to 4 carbon atoms, e.g. methyl, ethyl, propyl, isopropyl, butyl, etc. groups, and wherein at least one $R_1$ represents a hydroxyl group and the other $R_1$ represents a member selected from the group consisting of a hydrogen atom, an alkyl group of from 1–4 carbon atoms, a phenyl group, a nitro group or a halogen group such as chlorine or bromine, and X represents a member selected from the group consisting of a hydrogen atom, a hydroxyl group, an alkyl group of from 1–4 carbon atoms, a phenyl group, a nitro group or a halogen such as chlorine or bromine. All of the compounds above defined have unexpected and outstanding insecticidal properties, particularly against mites and aphids, as compared with compounds of somewhat related structures.

It is, accordingly, an object of the invention to provide a new class of organophosphorus compounds of the above defined structure. Another object is to provide compositions of these compounds that have utility as effective insecticides, especially against mites and aphids. Another object is to provide a method for preparing the above compounds and compositions. Other objects will be apparent from the description and examples.

In accordance with the invention, the above defined compounds of the invention are conveniently prepared by reacting a dialkyl phosphorothiolothionate and a p- or o-quinone or a substituted member thereof as illustrated in the following equation with unsubstituted p-quinone:

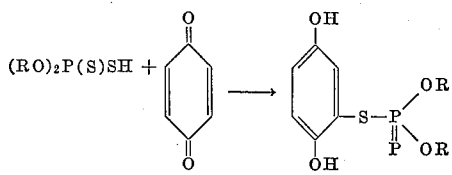

wherein R is as above defined. In general, the reactions are carried out by the portionwise addition of the quinone compound to the dialkyl phosphorothiolothionate; however, the order of addition is not critical. Also, although the products are obtained using any molar ratio of the reactants, the preferred procedure is to use approximately equimolar proportions of the quinone and dialkyl phosphorothiolothionate compounds. The reaction temperature can vary from about −25 to 150° C., but the preferred range is from 25–125° C. Suitable reaction periods are from 1 to about 8 hours. Catalysts are not necessary for the process to be operable; however, tertiary amines, for example triethylamine, can be used. If desired, inert solvents can be used as reaction mediums, but the reaction can be conducted in the absence of solvent. Among the solvents that can be used are the normally liquid hydrocarbons, for example, pentane, hexane, heptane, octane, benzene, toluene, xylene, mixtures of these compounds, various chlorinated derivatives thereof, or esters or ethers such as ethyl acetate, ethyl ether, and the like. The reaction is preferably carried out under normal atmospheric pressures, but pressures lower or higher than atmospheric are also operable.

Suitable quinones include quinone (p-benzoquinone), o-benzoquinone, alkyl or aryl substituted quinones such as, methylquinone, ethylquinone, n-butylquinone, phenylquinone, 4 - methyl-o-benzoquinone, 4 - phenyl-o-benzoquinone, 2,3-dimethylquinone, 2,5-dimethylquinone, 2,6-dimethylquinone, etc., nitro group substituted quinones such as nitroquinone, 2-nitro-3-methylquinone, 4-nitro-o-benzoquinone, etc., hydroxyl group substituted quinones such as hydroxyquinone, 2,5-dihydroxyquinone, 4-hydroxy-o-benzoquinone, etc., various halogenated quinones such as chloroquinone, 2,5-dichloroquinone, 2,6-dichloroquinone, 2,6-dibromoquinone, etc., and the like. Completely halogenated quinones such as tetrachloroquinone (chloranil) are not operable. Suitable dialkyl phosphorothiolothionates includes the dimethyl, diethyl, diisopropyl, di-n-propyl, di-n-butyl, methylethyl, propylbutyl, etc. phosphorothiolothionates.

The following examples further illustrate the preparation of the compounds and compositions of the invention and their utility.

Example 1.—O,O-diethyl S-2,5-dihydroxyphenyl phosphorothiolothionate

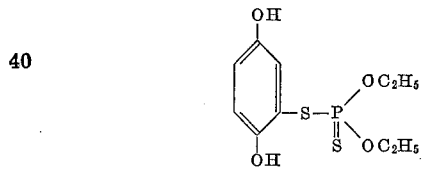

Diethyl phosphorothiolothionate (18.6 g., 0.1 mole) was placed in a reaction flask and stirred while p-quinone (10.8 g., 0.1 mole) was added in portions. The reaction was strongly exothermic and had to be moderated by external cooling. About 10 minutes were required to add all of the quinone. The reaction product was stirred for 30 minutes longer and then warmed gently on the steam bath for 15 minutes. The product of the above structure was a dark oil. Analysis of this product indicated 10.36% phosphorus.

Example 2.—O,O-dimethyl S-2,5-dihydroxy-3,6-dimethylphenyl phosphorothiolothionate

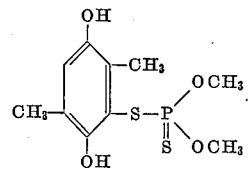

This compound was prepared from 13.6 g. (0.1 mole) of 2,5-dimethylquinone and 15.8 g. (0.1 mole) of dimethyl phosphorothiolothionate following the procedure of Example 1. Analysis of the oily product indicated 10.25% phosphorus.

*Example 3.—O,O-diisopropyl S-2,3,5,6-tetrahydroxyphenyl phosphorothiolothionate*

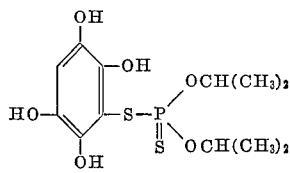

This compound was prepared from 14.0 g. (0.1) mole of 2,5-dihydroxyquinone and 21.4 g. (0.1 mole) of diisopropyl phosphorothiolothionate according to the procedure of Example 1. The product was isolated as a viscous oil.

*Example 4.—O,O-diethyl S-(2,5-dihydroxy-6-nitrophenyl)phosphorothiolothionate*

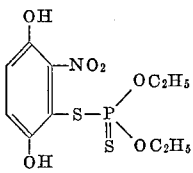

This compound was prepared from 15.3 g. (0.1 mole) of nitroquinone and 18.6 g. (0.1 mole) of diethyl phosphorothiolothionate according to the procedure of Example 1.

*Example 5.—O,O-diethyl S-(4,6-dichloro-2,5-dihydroxyphenyl)phosphorothiolothionate*

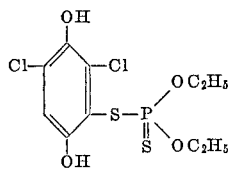

This compound was prepared from 17.7 g. (0.1 mole) of 2,6-dichloroquinone and 18.6 g. (0.1 mole) of diethyl phosphorothiolothionate according to the procedure of Example 1. The product was a heavy, yellow oil.

*Example 6.—O,O-diethyl S-(4,5-dihydroxy-2-biphenylyl) phosphorothiolothionate*

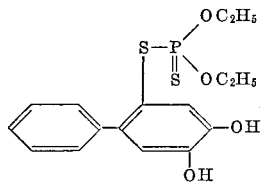

4-phenyl-o-benzoquinone (7.4 g., 0.04 mole) and diethyl phosphorothiolothionate (8.1 g., 0.04 mole) were mixed in 30 ml. of benzene. The reaction was exothermic, and the reaction mixture was stirred until it had cooled to 25° C. It was then heated on a steam bath for 45 minutes with stirring. The benzene was removed under reduced pressure leaving the product as a viscous, amber oil, $n_D^{20}$ 1.6112.

*Example 7.—Insecticidal activity*

Tests against mites and aphids were carried out in the following manner. Acetone solutions containing 1% by weight of the candidate compounds were prepared and diluted with water to give solutions containing the desired concentration for testing. Two heavily infested bean leaves containing adult two spotted mites (*Tetranychus bimaculatus* Harvey) were carefully dipped in the above solutions and dried in a gentle air stream. The leaves were then placed on damp paper toweling and observed after 24 hours for mortality among the adult mites. Similar tests were carried out against the cowpea aphid (*Aphis medicaginis* Koch). It should be noted that tests using acetone-water solutions containing no toxicant killed neither mites or aphids. This is the blank run referred to in the following table of results.

TABLE

| Toxicant: Product of Example 1. Concentration in p.p.m. | Percent kill, mites | Percent kill, aphids |
|---|---|---|
| 0 (blank) | 0 | 0 |
| 1,000 | 100 | 100 |
| 100 | 88 | 100 |
| 30 | 28 |  |

The products of Examples 2–6 were similarly effective as insecticides when tested in the above manner.

For insecticidal purposes, the substantially pure compounds of the invention can be used. However, it is also possible to use as insecticides products as produced in the above examples without further purification. This is particularly true when the reactants are employed in equimolar amounts, and the need for extensive purification procedures is thus avoided. By substituting in the above examples equivalent amounts of any other of the mentioned quinone or dialkyl phosphorothiolothionate reactants, other species coming within the invention and having similarly effective insecticidal properties are obtained. All of the products of the invention can be used in concentrated forms, but advantageously they are used in a diluted form, for example, as aqueous compositions. Any concentration can be used, provided only that the quantity is such as to give an insecticidally effective composition.

The invention has been described in detail with particular reference to preferred embodiments thereof, but it will be understood that variations and modifications can be effected within the spirit and scope of the invention as described hereinabove and as defined in the appended claims.

We claim:

1. An organo phosphorous compound selected from the group consisting of O,O-diisopropyl S-2,3,5,6-tetrahydroxyphenyl phosphorothiolothionate, O,O-diethyl S-(2,5 - dihydroxy-6-nitrophenyl)phosphorothiolothionate, O,O-diethyl S - (4,5-dihydroxy - 2-biphenylyl)phosphorothiolothionate and O,O-diethyl S-(4,6-dichloro-2,5-dihydroxyphenyl) phosphorothiolothionate.

2. O,O-diisopropyl S-2,3,5,6-tetrahydroxyphenyl phosphorothiolothionate.

3. O,O-diethyl S - (2,5-dihydroxy-6-nitrophenyl)phosphorothiolothionate.

4. O,O-diethyl S - (4,5 - dihydroxy-2-biphenylyl)phosphorothiolothionate.

5. O,O-diethyl S-(4,6-dichloro-2,5 - dihydroxyphenyl) phosphorothiolothionate.

References Cited

UNITED STATES PATENTS

| | | | |
|---|---|---|---|
| 2,910,402 | 10/1959 | Fairchild | 167—30 |
| 2,954,318 | 9/1960 | Ludvik | 167—30 |
| 3,056,825 | 10/1962 | Schegk et al. | 260—461.112 |
| 3,061,586 | 10/1962 | Thomson | 260—461.112 |
| 3,076,008 | 1/1963 | Norman et al. | 260—920 |
| 3,082,239 | 3/1963 | Muhlmann et al. | 260—461.112 |
| 3,143,507 | 8/1964 | Mastin et al. | 260—920 X |

FOREIGN PATENTS 784,612  10/1957  Great Britain.

CHARLES B. PARKER, *Primary Examiner.*

J. S. LEVITT, J. P. BRUST, *Examiners.*

D. B. MOYER, F. M. SIKORA, R. L. RAYMOND, B. BILLIAN, *Assistant Examiners.*